United States Patent [19]
Krysel

[11] Patent Number: 4,820,052
[45] Date of Patent: Apr. 11, 1989

[54] AIR DISTRIBUTION HEAD

[75] Inventor: Fred C. Krysel, Minnetonka, Minn.

[73] Assignee: Polar Tank Trailer, Inc., Holdingford, Minn.

[21] Appl. No.: 136,951

[22] Filed: Dec. 23, 1987

[51] Int. Cl.$^4$ .......................... B01F 13/02; B05B 1/30
[52] U.S. Cl. ..................................... 366/101; 137/860; 222/195; 239/533.13; 366/163; 366/341; 406/137
[58] Field of Search ............... 366/101, 106, 107, 163, 366/341; 222/195; 137/860; 406/86, 137; 239/533.13

[56] References Cited

U.S. PATENT DOCUMENTS 3,929,261 12/1975 Solimar .......................... 366/349 X
4,030,755 6/1977 Heimke .......................... 366/163 X
4,172,667 10/1979 Zenz et al. ...................... 366/107
4,556,173 12/1985 Pausch et al. .................... 137/860

Primary Examiner—Timothy F. Simone

[57] ABSTRACT

An air distributor head mounted in a sloping wall for a hopper for pulverulent material to agitate and aerate the material as it travels down the wall surface toward the discharge opening in the bottom of the hopper; the head assembly including a generally cylindrical head with air flow passages and having an expandable generally cylindrical resilient skirt surrounding the body thus permitting air supplied through the passages under the skirt to be discharged into the pulverulent material to incorporate a flow of agitating and fluidizing air into the material.

9 Claims, 2 Drawing Sheets

AIR DISTRIBUTION HEAD

BACKGROUND OF THE INVENTION

Pulverized materials such as flour and cement and the like are transported in enclosed tanks, either in the form of railroad tank cars or tank trucks, and transferring the material into and out of the tanks is accomplished by a closed pressurized air transfer system. Such finely divided materials must be aerated prior to being pneumatically conveyed by a closed pressurized air system. The tank is, of course, sealed and pressurized to force the material out through a number of one or more discharge openings provided in the bottom of the tank.

PRIOR ART

Distributor heads for introducing air into a hopper tank in close association to the discharge opening in the bottom thereof have been used in the past as exemplified in the following U.S. Patents:

| U.S. Pat. No. | Issue Date | Patentee |
|---|---|---|
| 3,929,261 | December 30, 1975 | Solimar |
| 4,030,755 | June 21, 1977 | Heimke |
| 4,172,539 | October 30, 1979 | Botkin |
| 4,556,173 | December 3, 1985 | Pausch & Sorenson |

Each of the devices embodied in said patents is intended to accomplish similar results to the results produced by the present invention. However, it has been found that discharging the air downwardly even at an oblique angle to the adjacent inside tank surface causes pitting of these areas of the inner tank surfaces. Also, it is desirable to distribute the air uniformly through a number of nozzles in order to insure complete removal of the pulverulent material.

SUMMARY OF THE INVENTION

The present invention provides a generally cylindrical air distributor head mounted within the hopper area of the tank surrounding the discharge opening therefrom. The head assembly includes an outer flexible and resilient skirt member attached at the top but having a free unattached lower portion through which air is free to flow outwardly into the tank from suitable distribution openings surrounded by the resilient overlying skirt element. The bottom of the head structure is provided with an enlarged deflecting flange immediately below the lower circumferential edge of the skirt to deflect the air flow outwardly in a direction substantially parallel to the tank surface surrounding the head. Another important feature of the system embodying the present invention is the provision of a uniform air supply system for each of the heads in order to substantially equalize the air flow around the tank discharge opening.

Figure 1:
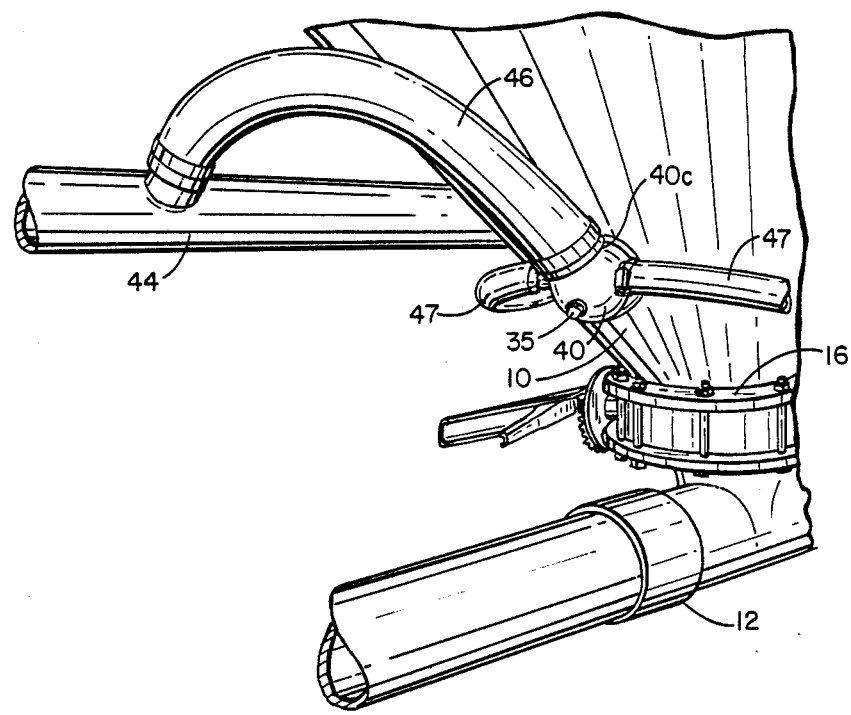
FIG. 1 is a perspective view of showing a portion of a typical hopper truck with my invention installed thereon.
Figure 2:
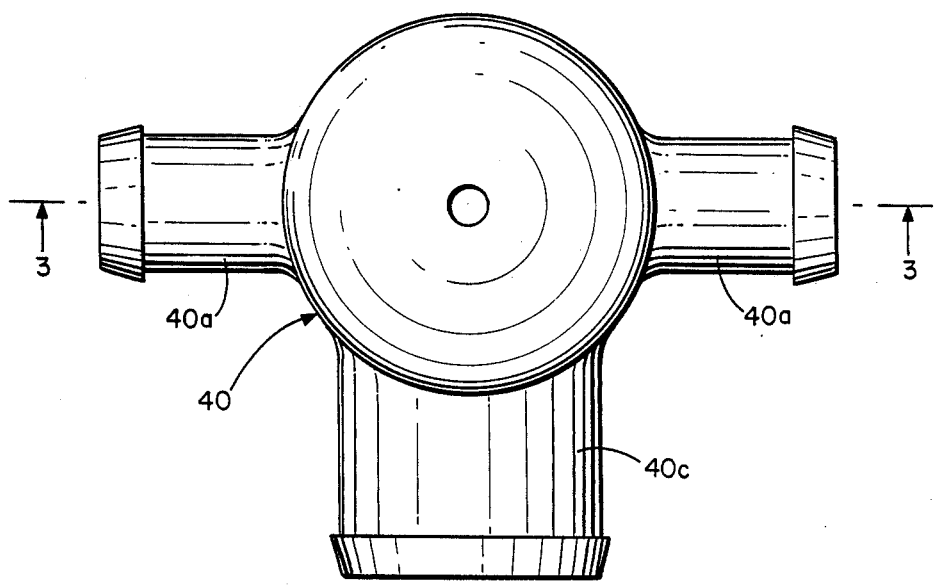
FIG. 2 is a top plan view of a main supply connector adaped to receive pressurized air and distribute the same to a plurality of distributor.
Figure 3:
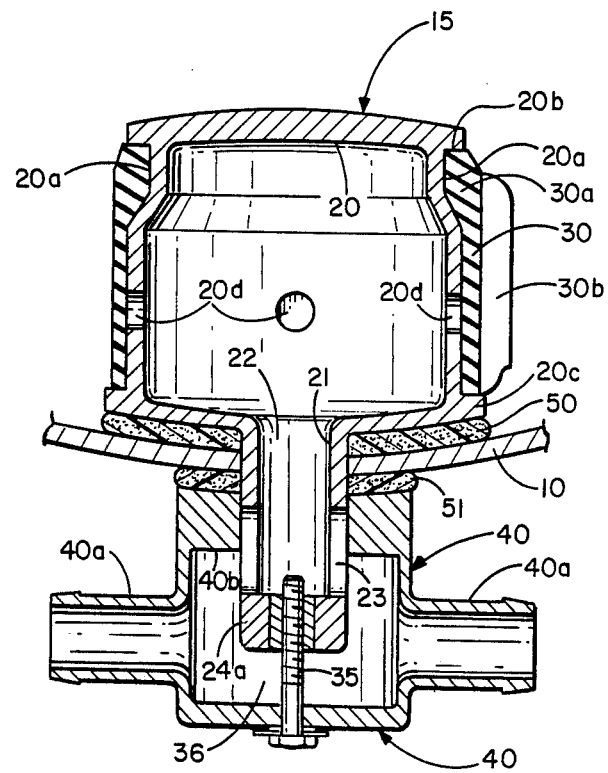
FIG. 3 is a central vertical sectional view of a supply connector taken substantially along the line 3—3 of FIG. 2 and showing a distributor head attached thereto; and, FIG. 4 shows a connector at the end of an air supply system with a distributor head attached thereto.
Figure 4:
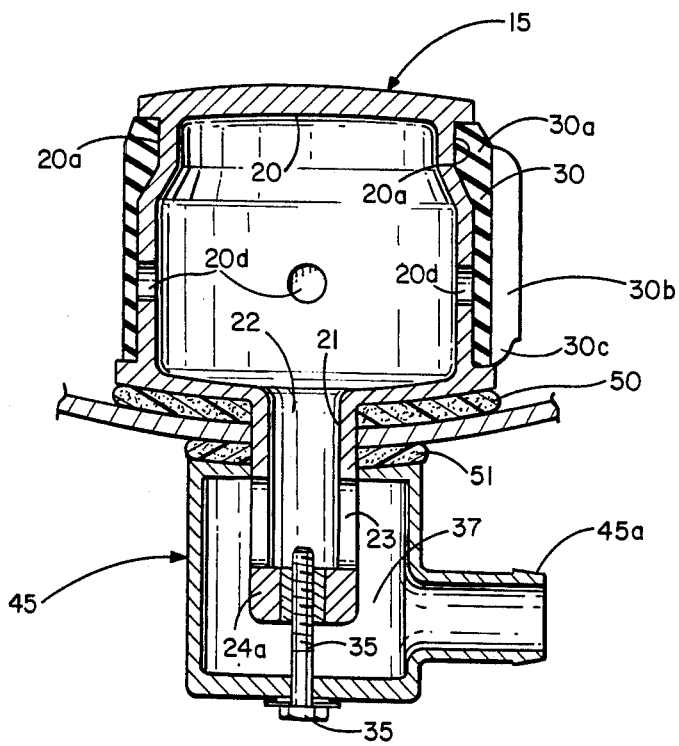

DETAILED DESCRIPTION OF THE PREFERRED EMBODIMENT

FIG. 1 illustrates a typical tank truck transport system for pulverulent material. The truck includes a hopper portion designated by the numeral 10 which tapers downwardly to a discharge opening at the bottom thereof which delivers the material under air pressure to a conveyer tube 12. Above the bottom of the hopper 10 a plurality of air distribution head assemblies 15 are mounted in circumferentially spaced relation and a collar assembly 16 is mounted at the bottom of the hopper around the discharge opening thereof and forms a delivery collar through which the material is discharged into the conveyer pipe 12 as best shown in FIG. 1 a plurality of air discharge heads 15 positively prevent clogging of the material at the lower mouth opening of the hopper 10.

Each of the air distribution head assemblies 15 includes a generally cylindrical inner body member 20 having a groove **20*a* in the upper portion thereof which defines an upper retaining flange 20*b* around the top of the casting. A bottom deflecting and retaining flange 20*c* at the bottom of the cylindrical portion of the inner body 20. The bottom of the body 20 is provided with a hollow stem portion 21 having an axial air flow passage 22 and a pair of supply opening 23**.

The inner body 20 has a resilient flexible skirt member 30 made from expandible material designed to fit snugly around the generally cylindrical surface of the body 20. A thickened anchoring bead **30*a* is formed around the top of the skirt 30 and is received in the groove 20*a* in the upper portion of the body 20. The lower circumferential free edge of the skirt 30 rides on the upper surface a the deflector flange 20*c* and is more stretchable than the thickened upper bead portion 30*a*. The air supplied through the intermediate hollow air passage 22 is discharged through openings 20*d* provided in the cylindrical side wall of the casting 20 and the air discharged through said openings stretches the resilient lower portion of the skirt member 30 and the air flows outwardly around the lower peripheral free edge of the skirt above the bottom flange 20*c* of the casting. The flange 20*c*** deflects the air outwardly in a direction generally parallel to the adjacent surface of the tank hopper.

The head 15 is securely anchored to the tank 10 by means of an anchoring bolt 35 which extends through a double nipple air supply connector 40 (as shown in FIG. 3) or through a single nipple connector 45 (as best shown in FIG. 4). The bolt 35 is received in the internally threaded base **24*a* of the stem 21 of head 15. The connector 40 shown in FIG. 3 is provided with a central chamber 36 and has a pair of discharge hose attachment nipples 40*a* each of which is connected to a branch conduit 47 as illustrated in FIGS. 1 and 3. In the form shown in FIGS. 1 and 2, a air supply tube 46 connects the double nipple connector 40 to a main pressure supply line 44 by means of a main supply nipple 40*c*. Branch conduits 47 are respectively connected to a pair of single nipple connectors 45 each with a central chamber 37 and a discharge hose attachment nipple 45*a* (shown in FIG. 4), to form a three head supply assembly as illustrated. The effective size of the openings 23 in the stem 21 of the head 15 mounted on the double nipple connector 40 are reduced by a restricting ring 40*b*** at the top of connector 40 so that the air flow into the attached head 15 is restricted and a substantially equal quantity of air is supplied through the double nipple connector 40 to the head 15 attached thereto as is supplied to the heads 15 attached to the end single nipple connectors 45 positioned at the end of each three-head supply assembly. With the three-head assembly shown, it has been found that a restrictive ring 40b that produces a 10% reduction of air supplied to the adjacent head 15 will equalize the air flow through all three heads. The construction of all of the inner airflow heads 15 mounted inside the tank is uniform. Suitable gaskets 50 and 51 are provided for both the inside and the outside of the tank shell 10 as best shown in FIGS. 3 and 4. The outside of the skirt 30 is provided with a plurality of spaced apart generally axially arranged ribs 30b to control the stiffness of the skirt 30. The lower ends 30c of the ribs 30b may be generally reduced in thickness to control the resistance to expansion of the bottom periphery of the skirt 30. Also, it will be seen that the air discharged around the lower peripheral edge of the skirt and is deflected circumferentially outwardly by the adjacent surface of the flange 20c. This substantially illiminates the problem of the "cavitation" effect of the high velocity air flow combined with the finely divided material being carried by the circumferential air flow.

What is claimed is:

1. Apparatus for agitating and aerating finely divided material in a hopper, said apparatus comprising:
   a hollow generally cylindrical air distributor body having upper and lower portions and defining a chamber therewithin with air flow passages formed there-through,
   a resiliently yieldable skirt member mounted around the outer side wall of said cylindrical distributor body to form a head assembly and being anchored at the upper portion of said body with the lower circumferential portion of said skirt being free to expand under the pressure of air discharged through the air flow openings,
   means for supplying air under pressure into the chamber within said body, and
   means for mounting the head assembly within a lower portion of a hopper unit to permit the air discharged around the lower circumferential portion of the resilient skirt portion to flow into finally divided material contained in the hopper to assist in discharging said material through an opening in the bottom of the hopper.

2. The structure set forth in claim 1 and said cylindrical body having a circumferential flange around the base thereof is close proximity to the inside surface of the hopper to provide a bottom support for the lower edge of said skirt and guide the air discharged around the lower edge of the skirt in a path generally parallel to the inner surface of the hopper.

3. The structure set forth in claim 1 wherein said means for mounting the head assembly within the hopper including a connector defining restrictive passages therein and including:
   a plurality of opposed nipples for connection to respective connection hoses,
   a main supply nipple adapted to be connected to a source of air under pressure to deliver air to said restrictive passages for ultimate distribution to additional connector elements and head assemblies of a system.

4. The structure set forth in claim 1 and a plurality of circumferentially spaced apart stiffening ribs formed on the outside of skirt member and extending downwardly to the lower portion of the skirt.

5. The structure set forth in claim 4 and the lower ends of the ribs being generally tapered to control the resistance to expansion of the lower circumferential end of the skirt.

6. An air distributor system for discharging air into a hopper at a plurality of selected locations for aerating and agitating finely divided material in the hopper, said assembly comprising,
   a plurality of hollow head assemblies,
   a hollow stem fixed to each head assembly and extending downwardly therefrom, and defining an airflow passage therethrough,
   said hollow stem having openings therein communicating with said passage,
   a supply connector for each head assembly having a hollow central chamber receiving said stem with means for securely clamping the upper edge of the connector and the lower edge of the head on opposite sides of the hopper to be aerated,
   a restricting ring formed on said connector and extending down into said chamber in closely spaced relation to the openings in said stem to controllably restrict the air flow from the central chamber through said openings into the airflow passage, and
   said connector having a plurality of discharge passages communicated with said central chamber to distribute the air supplied to said chamber to other distributor head assemblies.

7. The structure set forth in claim 6 and
   said restricting ring restricting the air flow into the additional head members to equalize the flow thereto.

8. The structure set forth in claim 6 and said connector having a pair of attachment nipples with branch conduits respectively connected therewith, and
   a pair of connectors respectively connected to said conduits for supplying air to a pair of head members connected therewith whereby the air flow through the branch conduits to the respective head members connected therewith is equalized with the first head member.

9. The structure set forth in claim 7 and a plurality of end connectors, each having only a single nipple to supply air to a head assembly at the ends of the air supply system.

* * * * *